Dec. 10, 1940. G. J. GRETZ 2,224,152
CARBURETOR
Filed Feb. 10, 1938

INVENTOR
George J. Gretz
By Green & McCallister
His Attorneys

Patented Dec. 10, 1940

2,224,152

UNITED STATES PATENT OFFICE 2,224,152

CARBURETOR

George J. Gretz, Glenshaw, Pa.

Application February 10, 1938, Serial No. 189,826

4 Claims. (Cl. 261—41)

This invention relates to down draft carburetors and one object thereof is to produce a down draft carburetor in which there will be no after drip when the vehicle upon which the carburetor is installed is brought to a sudden stop or when the engine is stopped while the vehicle is on any normal grade.

Another object is to produce a down draft carburetor which is free from "soft spots" throughout the entire range from closed to wide open throttle.

A further object is to improve the idling in down draft carburetors by obtaining a better control of fuel to the idling jets.

A still further object is to produce a down draft carburetor which is extremely flexible and by means of which not only maximum power but maximum efficiency can be obtained.

These as well as other objects which will be apparent to those skilled in the carburetor art, I attain by means of the carburetor described in the specification and illustrated in the drawing accompanying and forming part of this application and throughout which similar parts are denoted by like characters.

Figures 1, 2, 3, 4, 5, 6, 7:
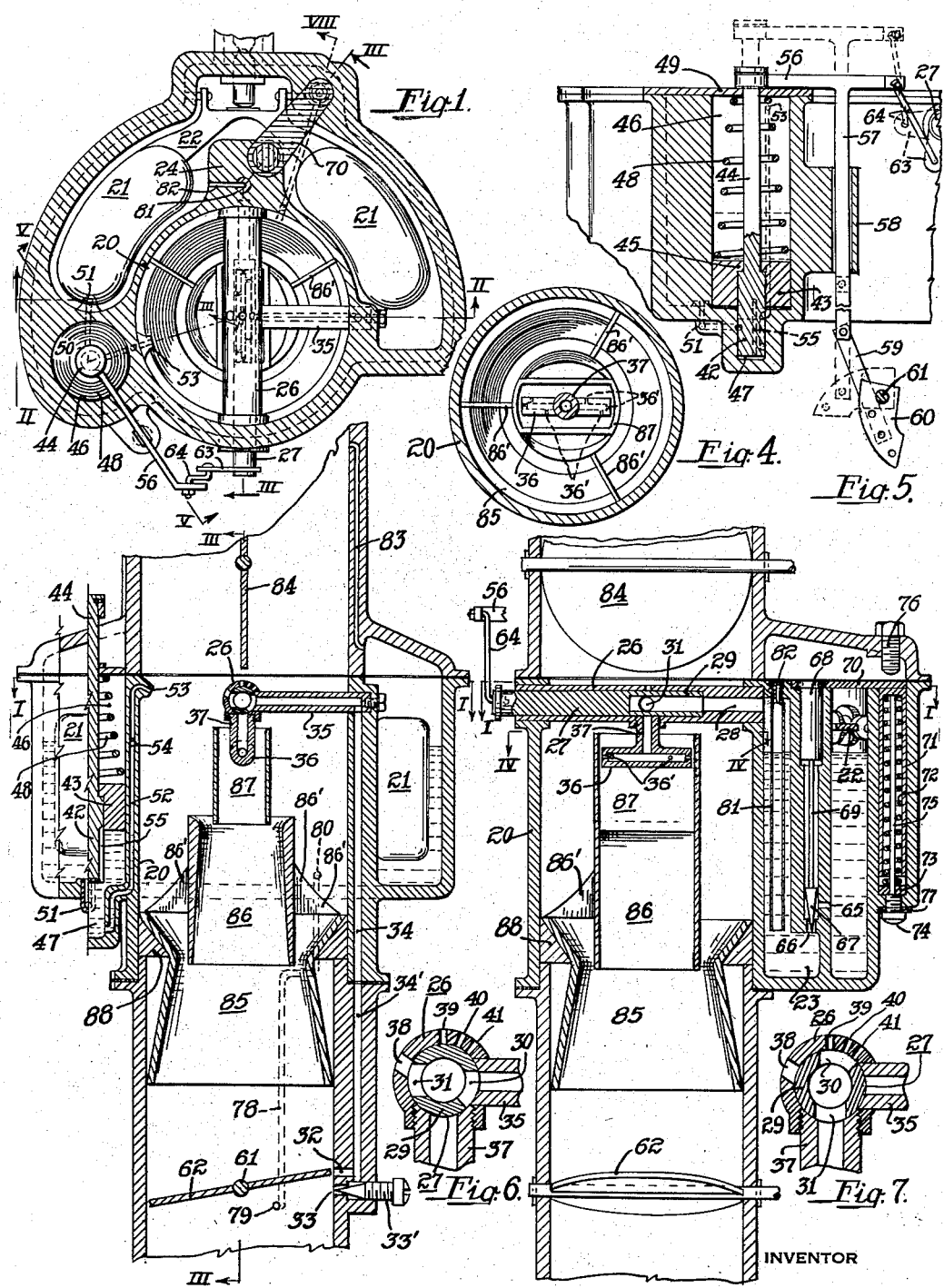
Figure 1 is a transverse section of a carburetor embodying this invention and this view is taken on line I—I of Fig. 2.
Fig. 2 is a sectional elevation taken on line II—II of Fig. 1.
Fig. 3 is a sectional elevation taken on line III—III of Figs. 1 and 2.
Fig. 4 is a transverse section taken on line IV—IV of Fig. 3.
Fig. 5 is a detail elevational section taken on line V—V of Fig. 1.
Fig. 6 is an enlarged sectional view of the control valve for the high and low speed jets or nozzles and shows the valve open to the low speed jets.
Fig. 7 is a view similar to Fig. 6 and shows the valve open to the high speed jets.

The carburetor of this invention embodies a novel constant level float chamber; a novel distributing valve for controlling the flow of fuel to the main and low speed jets or nozzles; a novel accelerating pump; a novel metering system and novel mixing chamber structures.

This carburetor, like most modern carburetors, comprises three sections; the air horn or inlet section within which the choke is located, the central or body section and the mixture outlet section in which the throttle valve is located and into which the idling and low speed jets or nozzle discharge. The central or body section contains the float chamber, the main jet or nozzle device, the mixing chamber structures, the distributing valve, the accelerating pump and the metering system.

*Float chamber and main fuel well*

The float chamber is formed as part of the central body section and, as shown in the drawing, extends but approximately half way around the central tubular portion 20 of the body section. The float is formed of two identical parts 21—21 carried by a connecting portion 22 and in the usual way controls the flow of liquid fuel to the float chamber in order to maintain a constant level therein.

The main fuel well 23 which is supplied with fuel from the float chamber under control of the valve of the metering system is located in a boss 24 which projects from the forward side of tubular portion 20 of the body section. As shown in Figs. 3 and 8 the floor of the float chamber at that portion adjacent the boss is provided with a depression and the boss extends to the bottom of this depression and joins the floor of the same.

The fuel well is located at that point about which the float chamber tilts as the carburetor is tilted during normal operations of the vehicle upon which it is installed. For this reason, a nearly constant height of fuel is maintained in well 23 at all times when the engine is at rest; at such time the upper surface of the fuel in well 23 is subjected to atmospheric pressure. It may be said that the fuel well is located at the center of the body of fuel within the float chamber so that no matter in which direction the carburetor is tilted, during normal operation, a substantially constant level of fuel will be maintained in said well, assuming that the engine is at rest.

*Main fuel distributing valve*

The main fuel valve is located within the main fuel channel which is formed as a tubular member 26 and which extends across the top of the body section a distance above the normal fuel level in the float chamber and fuel well 23. This tubular member as shown in Fig. 3, is provided with a two diameter through hole or bore. The larger bore forms the housing for a rotary valve member 27. The outer end of the smaller bore 28 connects with the upper end of fuel well 23. The inner end 29 of valve member 27 is of tubular form and as shown is provided with ports 30 and 31 which control the flow of fuel alternately to the main and low speed jets or nozzles (see Figs. 6 and 7). Fuel for supplying the main fuel jets flows from the interior of valve member 27 through port 31 while fuel for supplying the low speed jets or nozzles flows from the interior of valve member 21 through port 30. The fuel passing through port 30 flows to the low speed jets or nozzles 32 and 33 by way of registering ducts or channels 34, 34', and a tube 35 which connects the interior of tubular valve member 27 with the upper end of duct 34. Jet or nozzle 33 is controlled by a needle valve 33'. The low speed nozzles or jets are of orthodox construction now in general use. A horizontal main or high speed fuel jet or nozzle tube 36, provided with side and end fuel discharge openings or jets 36', connects with the interior of tubular member 26 by means of a vertically disposed tubular branch 37.

Tubular member 26, in circumferential alignment with branch 37 and ports 30 and 31 in the tubular part of valve member 27, is provided with ports 38, 39, 40 and 41 (Figs. 6 and 7). Port 38 serves to bleed air to the interior of valve member 27 when low speed jets 32 and 33 are placed in communication with fuel well 23. Ports 39, 40 and 41 bleed air into the interior of valve member 27 when the main fuel jets or nozzles 36 are placed in communication with the fuel well. Ports 40 and 41 successively bleed air into the interior of valve member 27 as said valve member is being rotated from low to high speed position and again from high to low speed position (Figs. 6 and 7).

With the engine idling at closed throttle, port 38 bleeds air into what may be termed the idling system. As the throttle is being opened, port 38 is being closed, thus cutting down the air admitted to the interior of valve member 27 whereby a richer mixture is secured for off idle position of the throttle. Port 38 is smaller than port 31, and is closed prior to the time the flow of fuel to the low speed jets from port 30 is cut off during counterclockwise rotation of valve member 27. Starting from idling position shown in Fig. 6; to full open or high speed position shown in Fig. 7, ports 41 and 40 successively come into play and admit air to the interior of valve member 27 during this transition period. By the time port 41 is uncovered it is assumed that the speed of the engine corresponds to a car speed of approximately 20 miles per hour. At this engine speed, the velocity of the air flowing downwardly past the main jets 36 will be great enough to cause the desired flow of fuel from said jets. The air bleed ports are utilized to prevent syphoning such as occurs in many types of present day down draft carburetors.

As the throttle is closing, the flow of fuel through the main jets is decreased and by the time the throttle is completely closed, the flow of fuel to the main jets is completely cut off. At closed throttle position, the vacuum on the engine side of the throttle causes fuel to flow through the idle channel and to be discharged from jets 32 and 33. There is no after drip from the main jet during this transition period because of the fact that at half closed throttle, the velocity of the air passing the idle jets is sufficient to lift to tube 35 any fuel lingering in jet tube 36.

The fuel distributing valve member 27 located as it is in the main fuel channel makes it possible to raise this channel to such a height above the normal fuel level in the float chamber that fuel is prevented from flowing by gravity from the float chamber into the main fuel channel because of any grade which would be encountered during normal operation of the vehicle upon which the carburetor is installed. I have found that there is no hesitation in the operation of the engine when changing from the low to the high speed jets as so often occurs in other types of down draft carburetors.

*Accelerating pump*

The accelerating pump is located at one side of the central body portion of the carburetor and is so connected to the shaft of the throttle valve that at each sudden opening of the throttle valve, a jet of fuel is discharged toward the main fuel jet tube 36.

The pump is provided with two concentrically arranged plungers; a main plunger 42 and a supplemental plunger 43. Stem or rod 44 of the main plunger is operatively connected to the shaft of the throttle valve (as later described).

The main plunger 42 is of relatively small diameter and about twice the length of the supplemental plunger 43 which surrounds and slides on the main plunger. The supplemental plunger at its top is provided with an inwardly extending annular flange 45 which fits the plunger rod 44 with a sliding fit and by contacting with the top of the main plunger limits the downward movements of the supplemental plunger.

On upward strokes of the pump both plungers move together; the supplemental plunger being carried by the main plunger. The supplemental plunger works within cylinder 46 while the main plunger works within sub cylinder 47 formed as a bottom extension of cylinder 46.

A coiled spring 48 of the cone type is interposed between the top of supplemental plunger 43 and a cover 49 for cylinder 46. This spring tends to yieldingly hold the supplemental plunger in contact wtih the main plunger during down or expulsion strokes of the pump.

Upon up strokes of the pump, fuel flows into sub cylinder 47 from the bottom of the float chamber through a duct or channel 50 which is provided with a non-return valve diagrammatically illustrated at 51. Upon each quick down stroke of the main plunger 42 which occurs each time the throttle valve is opened quickly, fuel is discharged by the main plunger through a duct or channel 52 to outlet orifice or jet 53 above referred to and which directs the fuel discharged therefrom toward the main fuel jet tube 36. This duct or channel is provided with a non-return valve more or less diagrammatically shown at 54. The main plunger is provided with a longitudinally extending groove 55 which is slightly longer than the depth of sub cylinder 47. This groove has a two-fold purpose. When the throttle valve is opened slowly, the main plunger 42 will move down slowly and while some fuel will be expelled from accelerating nozzle 53, part of the fuel in sub cylinder 47 will pass up through this groove 55 into cylinder 46 from which it will be later expeled by the supplemental plunger through said groove and through accelerating nozzle 53 by way of duct or passage 52.

Upon a quick downward movement of the main plunger which occurs upon each quick opening of the throttle, a larger amount of fuel will be discharged through accelerating nozzle 52 by the main plunger than would be discharged on a slow opening of the throttle and the fuel trapped in cylinder 46 below supplemental piston 43 will be gradually expelled from this cylinder by way of groove 55 and duct 52 to and through the accelerating nozzle 53. The supplemental piston acts as a follow up piston and prolongs the period during which the accelerating discharge takes place.

Plunger rod 44 at its top is connected to a cross member 56 secured to the top of a rod 57 and is mounted for vertical reciprocation within a guide member 58. The lower end of this rod by means of a link 59 is connected to a segment 60 which is fast on shaft 61 of the butterfly throttle valve 62. From this construction, it will be apparent that the accelerating pump operates in synchronism with the throttle valve and functions so as to provide a supply of accelerating fuel at the times needed and in the amounts needed. The outer end of member 27 of the distributing valve carries a crank arm 63 and this arm by means of an offset link 64 is connected to one end of cross member 56. By this means the distributing valve is caused to act in synchronism with the throttle valve.

*Metering system*

The metering device of this invention not only functions to control the normal flow of fuel from the float chamber to the fuel well 23, but also serves to enrich the mixture supplied by the main fuel jets when the depression in the mixture outlet is momentarily destroyed by sudden opening of the throttle valve.

Fuel flowing from the float chamber to fuel well 23 passes through orifices 65 and 66. The effective area of orifice 66 is controlled by means of a needle valve 67. The enlarged portion 68 of the stem 69 of this needle valve serves as a guide and its upper end is secured to one end of a bridge member 70. Bridge member 70 at its opposite end is rigidly secured to a depending tubular plunger 71 which is open at its lower end. A coiled spring 72 is contained within tubular plunger 71 and at its upper end bears against the closed top of said plunger. At its lower end, this spring bears against a fixed annular abutment 73 and an adjustment screw 74 threaded through an opening in the bottom of the plunger cylinder carries a pin 75. The top of this pin contacts with the upper closed end of plunger 71 when the plunger is in its lowermost position as shown in Fig. 3.

The upper limit of movement of the plunger 71 is fixed by a limiting screw 76 which is threaded through an opening in the top of the carburetor in line with bridge member 70. Adjustment screw 74 which carries pin 75 is used to adjust the normal position of bridge member 70 and therefore the normal setting of needle valve 67. The normal effective area of the port 66 may thus be controlled by adjustment screw 74. I find that it is desirable to use shims 77 beneath the head of screw 74 in order to secure a more or less permanent but adjustable setting for the normal position of the needle valve.

A duct or channel 78 extends from orifice 79 which is located in the wall of the mixture outlet section below the throttle valve when the same is in closed position to an orifice 80 in the wall of the cylinder for plunger 71 and which is located below the bottom of said plunger when said plunger is in its lowermost position. This duct or channel subjects the under side of plunger 71 to the depression in the mixture outlet section below the throttle valve so that the needle valve 67 during normal operation of the carburetor occupies the position to which it is adjusted by screw 74 and its pin 75. Whenever the depression at orifice 79 is momentarily destroyed by a sudden opening of the throttle valve, the pressure at orifice 79 by reason of channel 78 permits spring 72 to raise the needle valve and momentarily increase the effective area of port 66. This permits the main fuel jets 36' to draw more fuel from fuel well 23.

A pressure relief tube 81 threaded into the top of boss 24 extends downwardly into fuel well 23 to about the level of orifice 66. The upper end of this tube by means of a duct 82 communicates with the interior of the float chamber above the fuel level therein.

The float chamber by means of a duct or channel 83 which extends upwardly to a point well above choke valve 84 subjects the fuel in said chamber to atmospheric pressure.

Pressure relief tube 81 prevents flooding of the carburetor due to expansion by heat of the fuel in well 23, when the engine is stopped. This is commonly known as boiling, and if expansion of the fuel in well 23 does occur while the engine is stopped, tube 81 serves as a submerged vent and returns fuel or fuel bubbles to the float chamber.

*Mixing device*

The mixing device comprises three sections 85, 86 and 87 arranged in superposed relation. Section 85 is a typical Venturi tube and is supported on an annular block 88 which rests on the upper end of the wall of the mixture outlet section of the carburetor. Sections 86 and 87 are preferably cast in one piece and are adapted to be supported in place by support brackets 86' which rest on the upper edge of section 85. Section 87 is elongated in transverse section and is substantially rectangular as shown in the drawing; having parallel sides and curved ends best shown in Fig. 4. This section is in effect a straight walled tube with its lower end merging into the upper end of section 86 and with its side walls extending below the top of section 86. Section 86 is a modified venturi as will be apparent from the drawing.

With this form of mixing chamber in which the horizontally arranged jet tube 36 is positioned within and spaced from the walls of the more or less rectangular chamber formed by the upper section thereof, the jet openings 36' are relatively close to an extended wall area and are spread over a much greater area than in the common form of carburetor where the upper section of the mixing chamber is circular and the jet tube is round with the jet openings extending through its side walls.

The combination of the elongated horizontally arranged jet tube 36 and the rectangular chamber within which it is located provides a most efficient and effective aspirating device for down draft carburetors.

I find that the air flowing into the interior of the mixing device through the openings between the different sections forms an ideal mixture; one that is homogeneous and dry and readily inflammable.

I find that I obtain maximum power and efficiency at all engine speeds without the appearance of any "soft spots." The combination of the rectangular sections with the circular Venturi section produces a homogeneous mixture throughout the entire range of throttle opening.

While I have shown the main jet tube 36 paralleling the tubular member 26 within which the distributing valve is located, I find it preferable to arrange these at right angles, one to the other, and to arrange the shaft of the trottle valve so that it is at right angles to the longitudinal axis of the jet tube rather than as shown. In some cases it may be desirable to arrange them as shown, even though in this arrangement tubular member 26 to some extent blocks the opening to the upper section of the mixing chamber.

Having thus described my invention, what I claim as new and desire to secure by Letters Patent is:

1. In a carburetor, a constant level fuel chamber, a mixing chamber of the Venturi type, a throttle valve adjacent the outlet of said mixing chamber, a main fuel jet adjacent the inlet to said chamber, low speed jets adjacent said throttle valve, a fuel well having a restricted connection with said fuel chamber, a tubular horizontal fuel channel located considerably above the normal fuel level in the fuel chamber, connecting with said well, having ports therein through which fuel is fed to said main and low speed jets and air bleed openings in an upper part thereof, and a tubular valve member mounted for rotation within said fuel channel and having oppositely positioned ports therein for alternately controlling the flow of fuel from said horizontal fuel channel to said main and low speed jets and the flow of air into said main fuel channel through said air bleed openings.

2. In a carburetor, a constant level fuel chamber, a mixing chamber of the Venturi type, a throttle valve adjacent the outlet of said mixing chamber, a main fuel jet adjacent the inlet to said chamber, low speed jets adjacent said throttle valve, a fuel well having a restricted connection with said fuel chamber, a tubular horizontal fuel channel extending across the interior of the carburetor above the normal fuel level in the fuel chamber, connecting with said well, having ports therein through which fuel is fed to said main and low speed jets and at least one air bleed opening in an upper part thereof, and a tubular valve member mounted for rotation within said fuel channel and having oppositely positioned ports therein for alternately controlling the flow of fuel from said horizontal fuel channel to said main and low speed jets and the flow of air into said main fuel channel through said air bleed opening.

3. In a down draft carburetor, a constant level fuel supply chamber, a mixing chamber of the Venturi type, a throttle valve below said mixing chamber, a vertically extending fuel well having a restricted fuel connection with said supply chamber, a horizontal fuel passage extending from said fuel well into the carburetor above said mixing chamber and above the normal fuel level in said well, a high speed jet device located within the mixing chamber and connecting with said horizontal passage, a low speed jet device located adjacent said throttle valve, a fuel channel extending from said horizontal passage to said low speed jet device, a hollow valve member mounted for rotation within said horizontal passage and provided with oppositely positioned ports for controlling the flow of fuel from said passage alternately to said high and low speed jet devices, and means for operating said valve member in synchronism with the throttle valve; said horizontal fuel supply passage being provided with an opening for bleeding air into said hollow valve member through one of said valve member ports when fuel is flowing from said member through the other port; the construction and arrangement of said ports being such that flow through one port does not cease until flow has started through the other port.

4. In a down draft carburetor, a constant level fuel supply chamber, a mixing chamber, a throttle valve located below and adjacent the outlet of the mixing chamber, a high speed jet within the mixing chamber, a low speed jet adjacent said throttle valve, an inverted U-shaped fuel passage having one vertical leg thereof extending below the fuel level in the fuel supply chamber and by means of a restricted passage being connected to said chamber; the other vertical leg extending to the low speed jet; the connecting portion of the inverted U-shaped fuel passage extending transversely of the carburetor above the mixing chamber and above the fuel level in the fuel supply chamber; a fuel connection between the high speed jet and the connecting portion of said U-shaped passage; the connecting portion of said U-shaped passage being provided with air bleed openings in the upper half thereof, a port for passage of fuel to the high speed jet in a lower wall portion and a port for passage of fuel to the low speed jet in a side wall portion; a hollow valve member mounted for rotation within said connecting portion, having one end thereof open to said connecting portion and having oppositely positioned ports therein arranged to cooperate with said high and low speed ports, and means operatively connecting said valve member to the throttle valve whereby they operate in synchronism; the construction and arrangement being such that said hollow valve member controls the flow of fuel to the high and low speed jets in accordance with the position of the throttle valve; the arrangement of said air bleed openings being such that in cooperation with the oppositely positioned ports in the hollow valve member, air is bled into said hollow valve member not only while the low and high speed jets are functioning independently, but also during the transition period when said hollow valve member is moving from one position to the other whereby syphoning is prevented.

GEORGE J. GRETZ.